United States Patent
Patel et al.

(10) Patent No.: US 12,407,598 B2
(45) Date of Patent: *Sep. 2, 2025

(54) CONNECTIVITY BETWEEN VIRTUAL DATACENTERS

(71) Applicant: VMware LLC, Palo Alto, CA (US)

(72) Inventors: Hitesh Patel, Newark, CA (US); Dileep K. Devireddy, San Jose, CA (US); Mingsheng Peng, Pleasanton, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,208

(22) Filed: Mar. 8, 2023

(65) Prior Publication Data

US 2023/0239238 A1 Jul. 27, 2023

Related U.S. Application Data

(63) Continuation of application No. 17/212,662, filed on Mar. 25, 2021, now Pat. No. 11,606,290.

(51) Int. Cl.
*H04L 45/586* (2022.01)
*H04L 45/02* (2022.01)
(Continued)

(52) U.S. Cl.
CPC ............ *H04L 45/586* (2013.01); *H04L 45/02* (2013.01); *H04L 45/3065* (2013.01); *H04L 45/42* (2013.01); *H04L 67/567* (2022.05)

(58) Field of Classification Search
CPC ..... H04L 45/586; H04L 67/567; H04L 45/02; H04L 45/3065; H04L 45/42
See application file for complete search history.

(56) References Cited

U.S. PATENT DOCUMENTS

| 8,830,835 B2 | 9/2014 | Casado et al. |
| 8,964,767 B2 | 2/2015 | Koponen et al. |

(Continued)

FOREIGN PATENT DOCUMENTS

| CN | 101977156 A | 2/2011 |
| CN | 111478850 A | 7/2020 |

(Continued)

OTHER PUBLICATIONS

Non-Published Commonly Owned U.S. Appl. No. 18/235,869, filed Aug. 20, 2023, 50 pages, VMware, Inc.

(Continued)

*Primary Examiner* — Glenton B Burgess
*Assistant Examiner* — Jihad K Boustany
(74) *Attorney, Agent, or Firm* — Quarles & Brady LLP

(57) ABSTRACT

Some embodiments provide a method that receives (i) definition of a group of virtual datacenters and (ii) addition of at least two virtual datacenters to the group. Each virtual datacenter is defined in a public cloud and includes a set of network management components and a set of network endpoints connected by a logical network that is managed by the network management components of the virtual datacenter. Based on the definition of the group, the method configures a gateway router to which each of the virtual datacenters of the group connect. The gateway router is for routing traffic between the virtual datacenters of the group. The method also configures, at each respective virtual datacenter, a respective router to route data traffic between the respective virtual datacenter and the other virtual datacenters to route traffic for the other virtual datacenters to the gateway router.

20 Claims, 8 Drawing Sheets

(51) Int. Cl.
  *H04L 45/302* (2022.01)
  *H04L 45/42* (2022.01)
  *H04L 67/567* (2022.01)

(56) References Cited

U.S. PATENT DOCUMENTS

| | | |
|---|---|---|
| 9,137,052 B2 | 9/2015 | Koponen et al. |
| 9,209,998 B2 | 12/2015 | Casado et al. |
| 9,288,081 B2 | 3/2016 | Casado et al. |
| 9,444,651 B2 | 9/2016 | Koponen et al. |
| 9,755,960 B2 | 9/2017 | Moisand et al. |
| 9,876,672 B2 | 1/2018 | Casado et al. |
| 9,935,880 B2 | 4/2018 | Hammam et al. |
| 10,091,028 B2 | 10/2018 | Koponen et al. |
| 10,193,708 B2 | 1/2019 | Koponen et al. |
| 10,735,263 B1 | 8/2020 | McAlary et al. |
| 10,754,696 B1 | 8/2020 | Chinnam et al. |
| 10,931,481 B2 | 2/2021 | Casado et al. |
| 11,005,710 B2 | 5/2021 | Garg et al. |
| 11,005,963 B2 | 5/2021 | Maskalik et al. |
| 11,171,878 B1 | 11/2021 | Devireddy et al. |
| 11,212,238 B2 | 12/2021 | Cidon et al. |
| 11,240,203 B1* | 2/2022 | Eyada ............... H04L 63/20 |
| 11,362,992 B2 | 6/2022 | Devireddy et al. |
| 11,582,147 B2 | 2/2023 | Raman et al. |
| 11,588,819 B1* | 2/2023 | Wei ................. H04L 67/1097 |
| 11,606,290 B2 | 3/2023 | Patel et al. |
| 11,729,094 B2 | 8/2023 | Arumugam et al. |
| 11,729,095 B2 | 8/2023 | Sadasivan et al. |
| 2007/0058604 A1 | 3/2007 | Lee et al. |
| 2008/0159150 A1 | 7/2008 | Ansari |
| 2009/0003235 A1 | 1/2009 | Jiang |
| 2009/0296713 A1 | 12/2009 | Kompella |
| 2009/0307713 A1 | 12/2009 | Anderson et al. |
| 2011/0126197 A1 | 5/2011 | Larsen et al. |
| 2011/0131338 A1 | 6/2011 | Hu |
| 2012/0054624 A1 | 3/2012 | Owens, Jr. et al. |
| 2012/0110651 A1 | 5/2012 | Biljon et al. |
| 2013/0044641 A1 | 2/2013 | Koponen et al. |
| 2013/0044751 A1 | 2/2013 | Casado et al. |
| 2013/0044752 A1 | 2/2013 | Koponen et al. |
| 2013/0044761 A1 | 2/2013 | Koponen et al. |
| 2013/0044762 A1 | 2/2013 | Casado et al. |
| 2013/0044763 A1 | 2/2013 | Koponen et al. |
| 2013/0044764 A1 | 2/2013 | Casado et al. |
| 2013/0142203 A1 | 6/2013 | Koponen et al. |
| 2013/0185413 A1 | 7/2013 | Beaty et al. |
| 2013/0283364 A1 | 10/2013 | Chang et al. |
| 2014/0282525 A1 | 9/2014 | Sapuram et al. |
| 2014/0334495 A1* | 11/2014 | Stubberfield ......... H04L 49/354 370/401 |
| 2014/0376367 A1 | 12/2014 | Jain et al. |
| 2015/0113146 A1* | 4/2015 | Fu .................. H04L 47/805 709/226 |
| 2015/0193246 A1 | 7/2015 | Luft |
| 2016/0105392 A1 | 4/2016 | Thakkar et al. |
| 2016/0127202 A1 | 5/2016 | Dalvi et al. |
| 2016/0170809 A1 | 6/2016 | Schmidt et al. |
| 2016/0182336 A1 | 6/2016 | Doctor et al. |
| 2016/0234161 A1 | 8/2016 | Banerjee et al. |
| 2017/0033924 A1 | 2/2017 | Jain et al. |
| 2017/0063673 A1 | 3/2017 | Maskalik et al. |
| 2017/0195517 A1 | 7/2017 | Seetharaman et al. |
| 2017/0353351 A1* | 12/2017 | Cheng ................. H04L 12/4625 |
| 2018/0270308 A1 | 9/2018 | Shea et al. |
| 2018/0287902 A1 | 10/2018 | Chitalia et al. |
| 2018/0295036 A1 | 10/2018 | Krishnamurthy et al. |
| 2018/0332001 A1* | 11/2018 | Redondo Ferrero ........................ H04L 61/5014 |
| 2019/0068500 A1 | 2/2019 | Hira |
| 2019/0104051 A1 | 4/2019 | Cidon et al. |
| 2019/0104413 A1 | 4/2019 | Cidon et al. |
| 2019/0149360 A1 | 5/2019 | Casado et al. |
| 2019/0149463 A1 | 5/2019 | Bajaj et al. |
| 2019/0327112 A1 | 10/2019 | Nandoori et al. |
| 2019/0342179 A1 | 11/2019 | Barnard et al. |
| 2020/0235990 A1* | 7/2020 | Janakiraman ....... H04L 41/0893 |
| 2021/0067375 A1 | 3/2021 | Cidon et al. |
| 2021/0067439 A1 | 3/2021 | Kommula et al. |
| 2021/0067468 A1 | 3/2021 | Cidon et al. |
| 2021/0075727 A1 | 3/2021 | Chen et al. |
| 2021/0112034 A1 | 4/2021 | Sundararajan et al. |
| 2021/0126860 A1 | 4/2021 | Ramaswamy et al. |
| 2021/0136140 A1 | 5/2021 | Tidemann et al. |
| 2021/0184898 A1 | 6/2021 | Koponen et al. |
| 2021/0314388 A1 | 10/2021 | Zhou et al. |
| 2021/0336886 A1 | 10/2021 | Vijayasankar et al. |
| 2021/0359948 A1 | 11/2021 | Durrani et al. |
| 2022/0094666 A1 | 3/2022 | Devireddy et al. |
| 2022/0311707 A1 | 9/2022 | Patel et al. |
| 2022/0311714 A1 | 9/2022 | Devireddy et al. |
| 2022/0377009 A1 | 11/2022 | Raman et al. |
| 2022/0377020 A1 | 11/2022 | Sadasivan et al. |
| 2022/0377021 A1 | 11/2022 | Sadasivan et al. |
| 2023/0006920 A1 | 1/2023 | Arumugam et al. |
| 2023/0006941 A1 | 1/2023 | Natarajan et al. |

FOREIGN PATENT DOCUMENTS

| | | |
|---|---|---|
| WO | 2013026050 A1 | 2/2013 |
| WO | 2022060464 A1 | 3/2022 |
| WO | 2022250735 A1 | 12/2022 |

OTHER PUBLICATIONS

Non-Published Commonly Owned U.S. Appl. No. 18/235,874, filed Aug. 20, 2023, 69 pages, VMware, Inc.

* cited by examiner

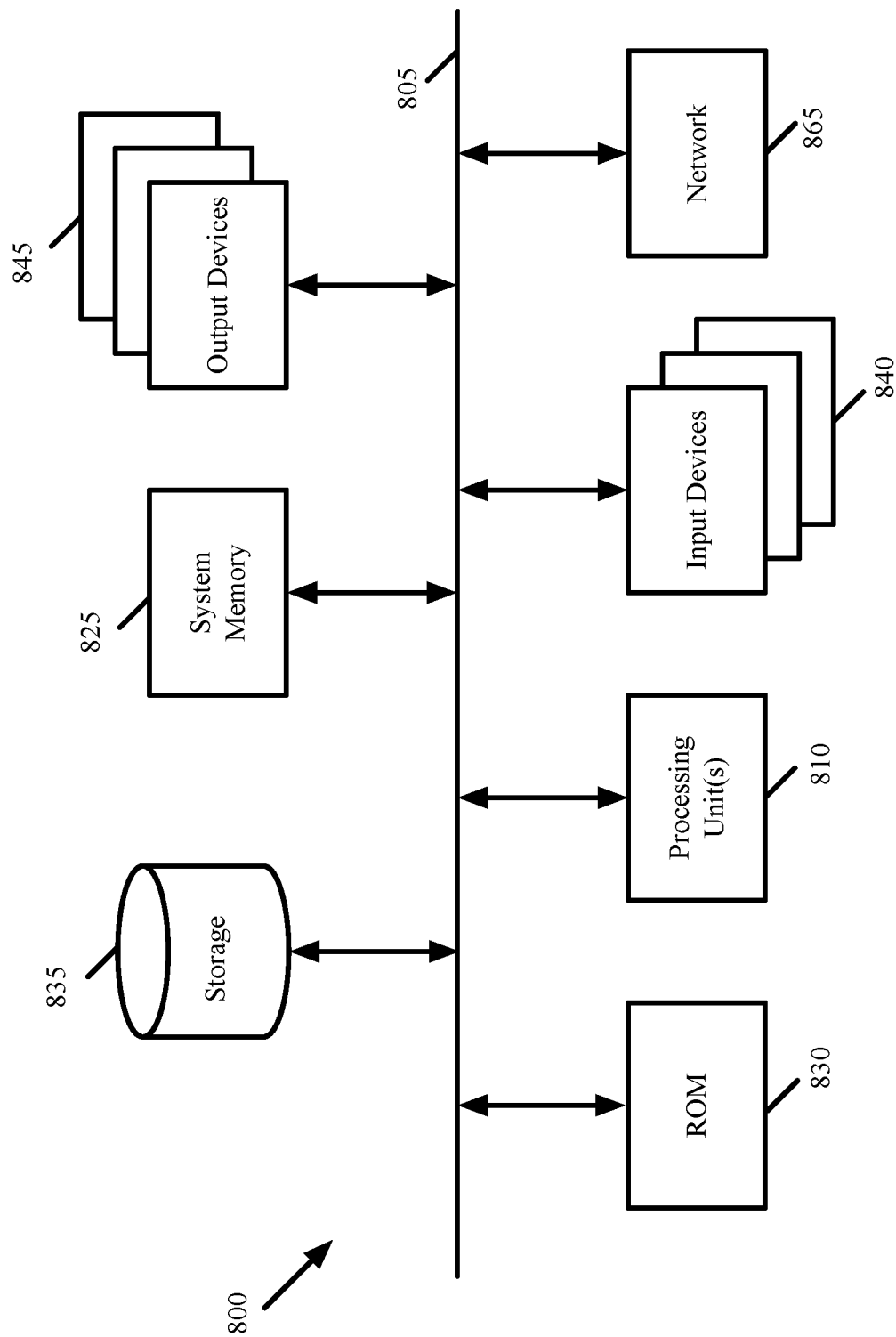

CONNECTIVITY BETWEEN VIRTUAL DATACENTERS

CLAIM OF BENEFIT TO PRIOR APPLICATIONS

This application is a continuation application of U.S. patent application Ser. No. 17/212,662, filed Mar. 25, 2021, now published as U.S. Patent Publication 2022/0311707. U.S. patent application Ser. No. 17/212,662, now published as U.S. Patent Publication 2022/0311707, is hereby incorporated by reference.

BACKGROUND

More and more enterprises have moved or are in the process of moving large portions of their computing workloads into various public clouds (e.g., Amazon Web Services (AWS), Google Cloud Platform (GCP), Microsoft Azure, etc.). If an enterprise uses one of the native offerings of these clouds, and only uses one public cloud for their workloads, then many of these public clouds offer connectivity between the workloads in the different datacenters of the same public cloud provider. For instance, AWS virtual private clouds (VPCs) can be connected via a transit gateway.

However, enterprises might want to use workloads in multiple public clouds as well as their on-premises/branch datacenters that are not as easily all connected without traffic traveling through the public Internet. In addition, some enterprises might want to retain management of their workloads in the cloud, rather than running native cloud provider managed workloads. Better connectivity between these workloads would therefore be beneficial.

BRIEF SUMMARY

Some embodiments provide a method for providing connectivity between virtual datacenters defined and operating within public clouds. The virtual datacenters, in some embodiments, are datacenters that include network and/or compute management components operating in the public cloud as well as network endpoints (workloads) connected by a logical network within the virtual datacenter. The network endpoints as well as the logical network are managed by the management components that operate within the virtual datacenter.

To provide connectivity between these virtual datacenters, a cloud management platform enables a user (e.g., a network administrator of the enterprise to which the virtual datacenters belong) to define a connectivity group of virtual datacenters and add virtual datacenters to the group. In some embodiments, all of the virtual datacenters in a group are defined and operate within physical datacenters of the same public cloud provider, while in other embodiments the virtual datacenters may be defined in datacenters of multiple different public cloud providers. In addition, some embodiments impose a restriction that all of the virtual datacenters in a group must be located in datacenters within a single predefined geographic region (e.g., Eastern US, Western US, Europe, East Asia, etc.). Other embodiments allow for a group to include virtual datacenters from multiple such geographic regions.

In some embodiments, the virtual datacenters are defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, a tenant logical network is defined, to which both the management components and the endpoint workloads connect. In some embodiments, the typical virtual datacenter logical network includes a first logical router (which can be referred to as a tier 0 (T0) logical router) for handling traffic entering and exiting the virtual datacenter as well as multiple additional logical routers that connect to this first logical router. These additional logical routers (which can be referred to as tier 1 (T1) logical routers) isolate different sets of logical switches (also referred to as network segments) from each other. Some embodiments include a first T1 logical router to which one or more management logical switches connect as well as a second T1 logical router to which one or more workload logical switches connect. The compute and/or network management components of the virtual datacenters are attached to the management logical switches. In some embodiments, the workload data compute nodes (DCNs) are connected to the workload logical switches as well as to one or more management logical switches (i.e., via different interfaces). These DCNs exchange data traffic with each other as well as DCNs at other virtual datacenters via the workload logical switches, and exchange control traffic with the management components in their virtual datacenter via the management logical switches.

When a group is defined, some embodiments automatically define and configure a centralized gateway router for connecting the virtual datacenters, as well as routers at the edges of each of the virtual datacenters that connect to the gateway router. In some embodiments, this centralized gateway router is implemented as a horizontally scalable regional logical router. That is, the centralized gateway router can be implemented as a single device or scaled to multiple devices that act as a single router in some embodiments.

The gateway router is configured to route data traffic between the network endpoints at each of the virtual datacenters, as well as to route management traffic between the management components and/or network endpoints at the virtual datacenters. The routers at each virtual datacenter are configured to route traffic sent from their respective virtual datacenter and directed to network addresses at any of the other virtual datacenters to the gateway router, which acts as a hub for routing traffic between the datacenters. Correspondingly, when the gateway router sends data traffic for a particular virtual datacenter to the router at the edge of that virtual datacenter, that router routes the traffic into the logical network of its virtual datacenter. In some embodiments, the router at a particular virtual datacenter that connects to the centralized gateway router connects to the logical network at the particular virtual datacenter via the T0 logical router of that logical network.

In order to configure these routers that handle the inter-datacenter traffic, the cloud management platform generates routing tables and provides these routing tables to the routers in some embodiments. The routing table for the centralized gateway router includes routes that instruct the gateway router to send traffic to each of the routers at the edge of the virtual datacenters. For each virtual datacenter, the routing table of the centralized gateway router includes one or more routes specifying that traffic directed to network addresses associated with the logical network at that virtual datacenter is to be forwarded to the router at the edge of that virtual datacenter. In addition, at each virtual datacenter, the router at the edge of that virtual datacenter is configured with (i) one or more routes specifying that traffic directed to network addresses associated with the logical network at that virtual datacenter is to be forwarded to the logical network (e.g., to the T0 router) at that virtual datacenter and (ii) one or more routes specifying that traffic directed to network addresses associated with the logical networks at the other virtual datacenters is to be forwarded to the centralized gateway router.

In some embodiments, the cloud management platform also allows the user to connect the virtual datacenters in a group to (i) native VPCs in a public cloud and/or (ii) on-premises datacenters. These native VPCs, in some embodiments, are not virtual datacenters in that they do not include management components and, in many cases, are not implemented on fully isolated hardware (e.g., the host computers that host DCNs of the VPC may also host DCNs for other VPCs of other public cloud tenants). The native VPCs may be managed through the cloud management platform or through a cloud provider platform. In some embodiments, the native VPCs may host services (e.g., load balancers, deep packet inspection, DHCP service, authentication services, endpoint services, etc.) used to process data traffic sent to or from the virtual datacenters.

An administrator might want the virtual datacenters to be able to connect to physical on-premises datacenters if only a portion of the enterprise's workloads are moved into the public cloud. In some embodiments, an additional gateway router (e.g., a specialized on-premises connection gateway) is defined in the public cloud in order to connect the on-premises datacenter to the one or more virtual datacenters in a connectivity group. The routing table of this additional gateway router is configured with routes that specify (i) to send data traffic directed to the on-premises datacenter to that datacenter and (ii) to send data traffic directed to the virtual datacenters to the centralized gateway router configured for the connectivity group. Similarly, the routing table of the centralized gateway router is configured with routes that specify to send data traffic directed to the on-premises datacenter to the additional gateway.

The centralized gateway router is also configured with routes to send traffic between any VPCs connected to the group and the virtual datacenters. Some embodiments place restrictions on the traffic that (i) allow traffic between two virtual datacenters in a group, (ii) allow traffic between any virtual datacenter in the group and a native VPC connected to the centralized gateway, (iii) allow traffic between any virtual datacenter in the group and an on-premises datacenter connected to the centralized gateway, (iv) do not allow traffic between two different on-premises datacenters connected to the centralized gateway, (v) do not allow traffic between two different native VPCs connected to the centralized gateway, and (vi) do not allow traffic between native VPCs and on-premises datacenters connected to the centralized gateways. In some embodiments, these are default security rules that the user of the cloud management platform can modify if desired.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 8 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for providing connectivity between virtual datacenters defined and operating within public clouds. The virtual datacenters, in some embodiments, are datacenters that include network and/or compute management components operating in the public cloud as well as network endpoints (workloads) connected by a logical network within the virtual datacenter. The network endpoints as well as the logical network are managed by the management components that operate within the virtual datacenter.

To provide connectivity between these virtual datacenters, a cloud management platform enables a user (e.g., a network administrator of the enterprise to which the virtual datacenters belong) to define a connectivity group of virtual datacenters and add virtual datacenters to the group. In some embodiments, all of the virtual datacenters in a group are defined and operate within physical datacenters of the same public cloud provider, while in other embodiments the virtual datacenters may be defined in datacenters of multiple different public cloud providers.

In some embodiments, the virtual datacenters are defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, a tenant logical network is defined, to which both the management components and the endpoint workloads connect.

Figure 1:
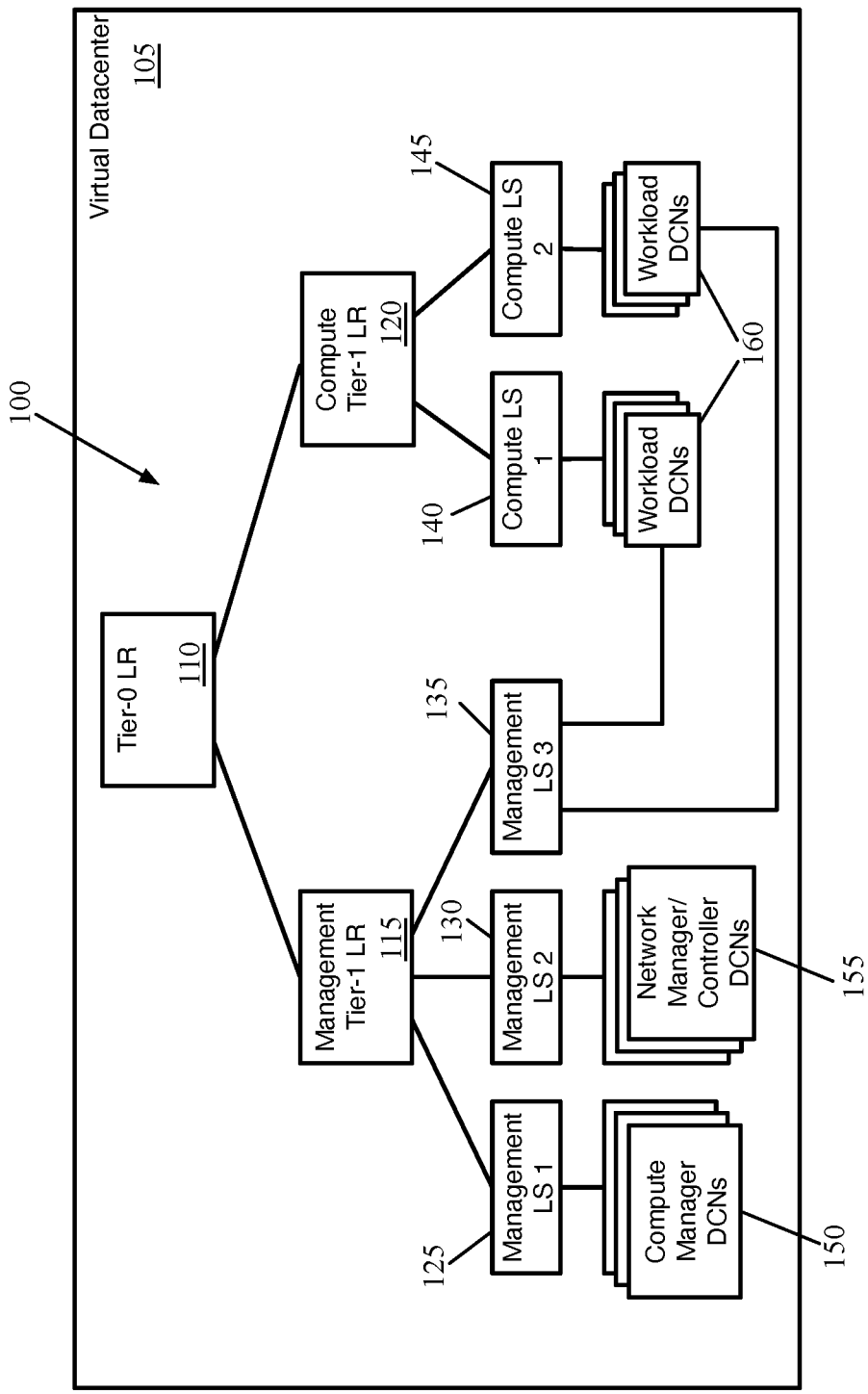
FIG. 1 conceptually illustrates a tenant logical network for a virtual datacenter of some embodiments.

FIG. 1 conceptually illustrates a tenant logical network 100 for a virtual datacenter 105 of some embodiments. As shown, the logical network 100 of the virtual datacenter is defined to include a tier-0 (T0) logical router 110, a management tier-1 (T1) logical router 115, and a compute tier-1 (T1) logical router 120. The T0 logical router 110 handles traffic entering and exiting the virtual datacenter 105 (e.g., traffic sent to other virtual datacenters or physical on-premises datacenters via a connectivity group, traffic between workloads at the virtual datacenter 105 and client devices connected to public networks, etc.). In addition, in some embodiments, some or all traffic between the management portion of the logical network 100 and the network endpoint workload data compute nodes (DCNs) is sent through the T0 logical router 110 (e.g., as a logical path between the management T1 logical router 115 and the compute T1 logical router 120). The T0 logical router 110 may also be defined to provide certain services for data traffic that it processes.

The management and compute T1 logical routers 115 and 120 are sometimes referred to as the management gateway and compute gateway. In some embodiments, a typical virtual datacenter is defined with these two T1 logical routers connected to a T0 logical router, which segregates the management network segments from the compute network segments to which workload DCNs connect. In general, public network traffic from external client devices would not be allowed to connect to the management network but would (in certain cases) be allowed to connect to the compute network (e.g., if the compute network includes web servers for a public-facing application). Each of the T1 logical routers 115 and 120 may also apply services to traffic that it processes, whether that traffic is received from the T0 logical router 110 or received from one of the network segments underneath the T1 logical router.

In this example, the virtual datacenter logical network 100 includes three management logical switches 125-135 (also referred to as network segments) and two compute logical switches 140-145. In this example, one or more compute manager DCNs 150 connect to the first management logical switch 125 and one or more network manager and controller DCNs 155 connect to the second management logical switch 130. The DCNs shown here may be implemented in the public cloud as virtual machines (VMs), containers, or other types of machines, in different embodiments. In some embodiments, multiple compute manager DCNs 150 form a compute manager cluster connected to the logical switch 125, while multiple network manager DCNs 155 form a management plane cluster and multiple network controller DCNs 155 form a control plane cluster (both of which are connected to the same logical switch 130).

The virtual datacenter 105 also includes workload DCNs 160. These DCNs can host applications that are accessed by users (e.g., employees of the enterprise that owns and manages the virtual datacenter 105), external client devices (e.g., individuals accessing a web server through a public network), or other DCNs (e.g., in the same virtual datacenter or different datacenters). The workload DCNs 160 in this example connect to two logical switches 140 and 145 (e.g., because they implement different tiers of an application, or different applications altogether). These DCNs 160 can communicate with each other, with workload DCNs in other datacenters, etc. via the interfaces connected to these compute logical switches 140 and 145. In addition, in some embodiments (and as shown in this example), the workload DCNs 160 include a separate interface (e.g., in a different subnet) that connects to a management logical switch 135. The workload DCNs 160 communicate with the compute and network management DCNs 150 and 155 via this logical switch 135, without requiring this control traffic to be sent through the T0 logical router 110.

Figure 2:
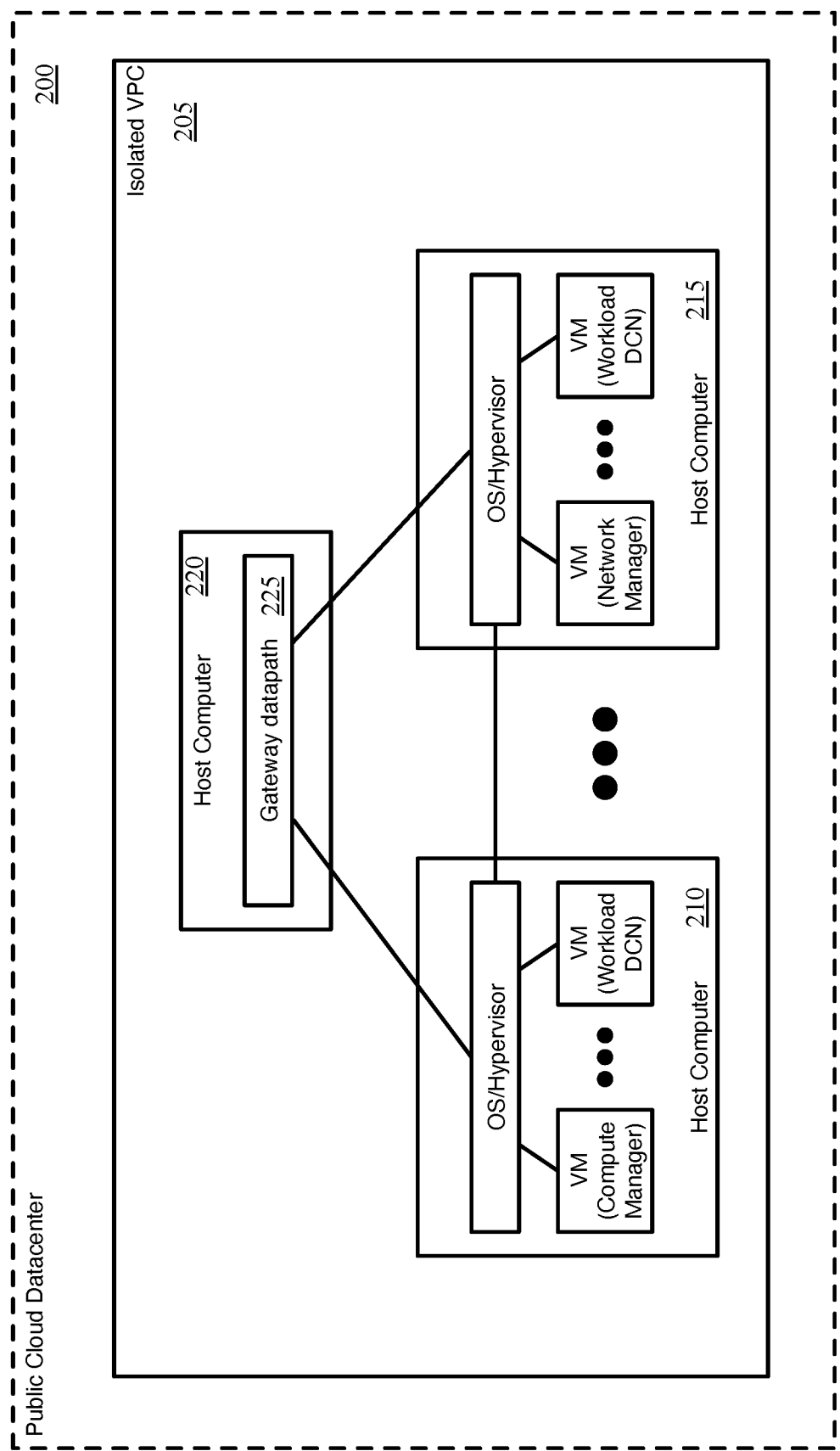
FIG. 2 conceptually illustrates the physical implementation of the virtual datacenter in a public cloud datacenter according to some embodiments.

FIG. 2 conceptually illustrates the physical implementation of the virtual datacenter 105 in a public cloud datacenter 200 according to some embodiments. As mentioned above, a virtual datacenter such as that shown in FIG. 1 is implemented within a VPC of a public cloud datacenter in some embodiments. This figure shows that the virtual datacenter 105 is implemented in an isolated VPC 205 of the public cloud datacenter 200. In some embodiments, this VPC 205 is allocated not just a set of VMs or other DCNs that execute on host computers managed by the public cloud provider and potentially shared with other tenants of the public cloud, but rather a set of host computers 210-220 of the public cloud datacenter 200. This allows the management DCNs to manage the hypervisors and other software of the host computers 210-220 (e.g., so that these hypervisors implement the virtual datacenter logical network 100.

In different embodiments, the entire virtual datacenter may be implemented on a single host computer of the public datacenter 200 (which may host many VMs, containers, or other DCNs) or multiple different host computers. As shown, in this example, at least two host computers 210 and 215 execute workload and/or management VMs. Another host computer 220 executes a gateway datapath 225. In some embodiments, this gateway datapath 225 implements a centralized component of the T0 logical router, such that all traffic between any external networks and the virtual datacenter is processed by the gateway datapath 225. Additional details regarding logical routers and their implementation can be found in U.S. Pat. No. 9,787,605, which is incorporated herein by reference.

Figure 3:
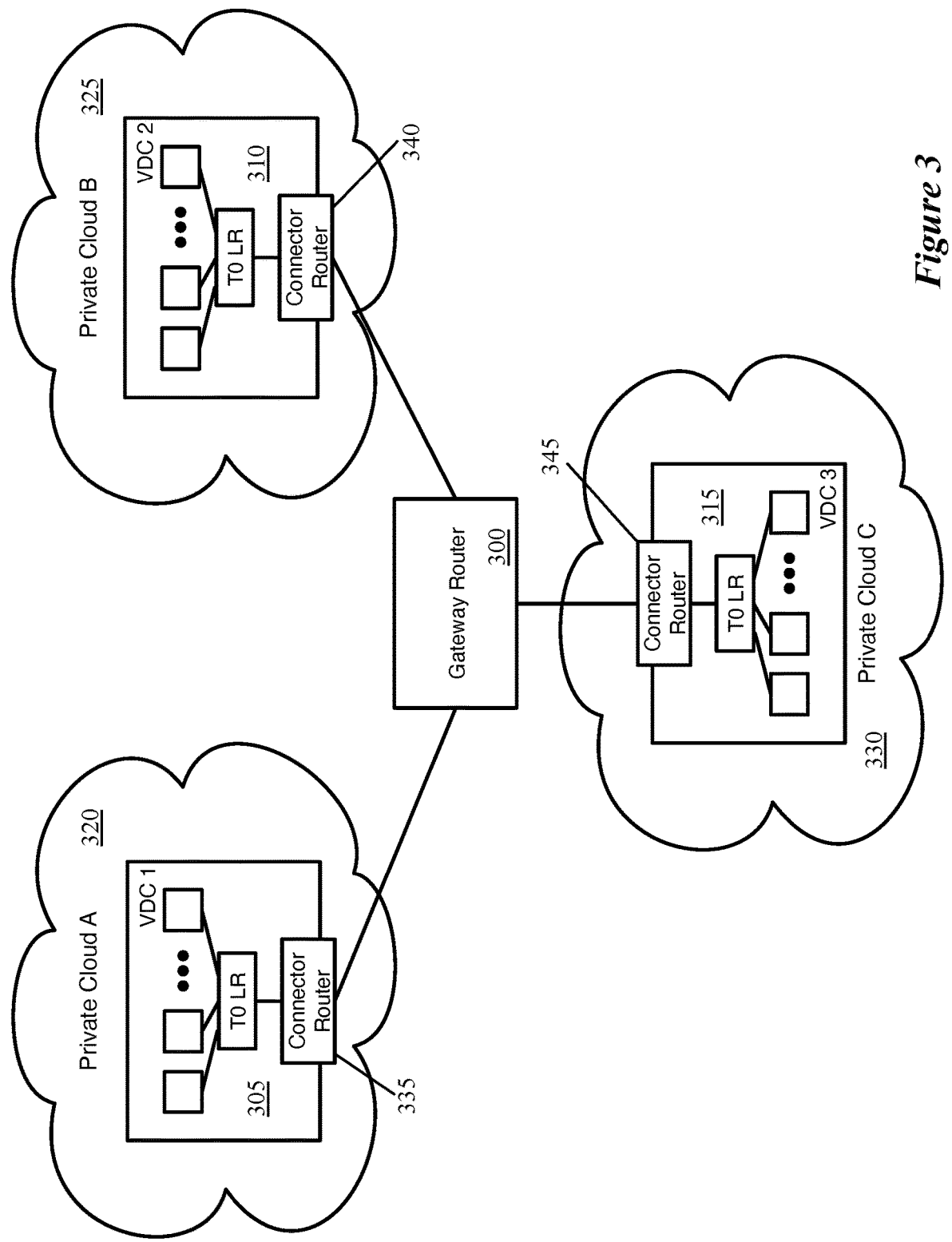
FIG. 3 conceptually illustrates a group of virtual datacenters connected in a connectivity group.

Now that virtual datacenters have been described, connectivity groups of some embodiments for securely connecting these virtual datacenters without requiring traffic to traverse public networks will be described. FIG. 3 conceptually illustrates a group of virtual datacenters 305-315 connected in a connectivity group. When such a connectivity group is defined, some embodiments automatically define and configure a centralized gateway router for connecting the virtual datacenters, as well as routers at the edges of each of the virtual datacenters that connect to the gateway router.

As shown, the connectivity group in FIG. 3 includes three virtual datacenters 305-315 that are implemented in three different private clouds 320-330 (e.g., VPCs within a public cloud). Each of these virtual datacenters 305-315 includes a T0 logical router for handling traffic entering and exiting the virtual datacenter, as well as compute and network managers that manage workload DCNs in the virtual datacenter (as shown in FIGS. 1 and 2). In this example, all three of the virtual datacenters 305-315 are located in different private cloud datacenters, though in some embodiments some or all of the virtual datacenters in a group can be located in the same physical datacenter.

The private cloud datacenters 320-330 can be within different physical datacenters that all belong to the same public cloud provider (e.g., AWS, Azure, etc.), or datacenters belonging to two or more different public cloud providers (e.g., two AWS datacenters and one Azure datacenter). In addition, as described further below, some embodiments require that all of the virtual datacenters in a group be implemented in public cloud datacenters located in the same geographic region (e.g., the Western US), while other embodiments allow virtual datacenters in a group to be located in different geographic regions (e.g., across multiple continents).

FIG. 3 also shows that, as a result of the creation of a connectivity group for connecting the virtual datacenters 305-315, a gateway router 300 is configured to handle traffic between the virtual datacenters, and connector routers 335-345 are configured at each of these virtual datacenters. Each of the connector routers 335-345 connects to the T0 logical router (e.g., to an uplink interface of the T0 logical router) at its respective virtual datacenter 305-315, as well to the gateway router 300. Thus, any traffic from one virtual datacenter to another is routed from the host computer that implements the T0 logical router at the first virtual datacenter, to the connector router for that virtual datacenter, to the gateway router 300, to the connector router at the destination virtual datacenter, to the host computer that implements the T0 logical router at the destination virtual datacenter, and thereby to the rest of the logical network at that virtual datacenter. That is, the gateway router 300 acts as a hub for routing traffic between the virtual datacenters in a connectivity group. In some embodiments, the gateway router 300 is implemented as a horizontally scalable regional logical router. That is, the gateway router 300 can be implemented as a single device or scaled to multiple devices that act as a single router in some embodiments. These devices can be located at a single cloud or scaled to multiple clouds, in different embodiments. The connector routers 335-345 are implemented as logical routers at each virtual datacenter, in some embodiments. In some embodiments, the connector routers are part of the virtual datacenter, while in other embodiments the connector routers are implemented within the private cloud but outside of the virtual datacenter.

In some embodiments, the gateway router and connector routers are configured by a cloud management platform that is used to (i) setup the virtual datacenters and (ii) form connectivity groups for the virtual datacenters. The cloud management platform, in some embodiments, receives configuration instructions from a user (e.g., a network administrator for an enterprise that manages the virtual datacenters) and translates these configuration instructions into configuration data for the virtual datacenters, the gateway router, the connector routers, etc. The configuration instructions include requests such as creation of virtual datacenters, creation of a connectivity group, addition of virtual datacenters to the connectivity group, removal of virtual datacenters from the connectivity group, etc.

Figure 4:
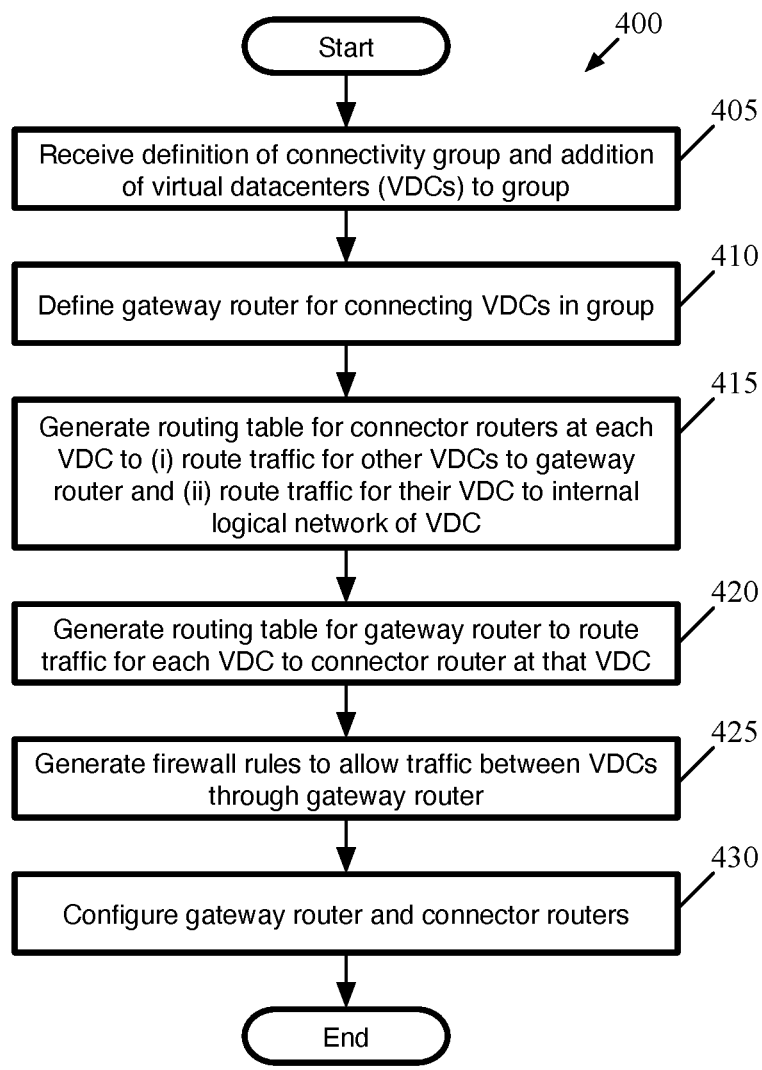
FIG. 4 conceptually illustrates a process of some embodiments for configuring a gateway router and connector routers in order to connect a set of virtual datacenters added to a connectivity group.

FIG. 4 conceptually illustrates a process 400 of some embodiments for configuring a gateway router and connector routers in order to connect a set of virtual datacenters added to a connectivity group. In some embodiments, the process 400 is performed by a cloud management platform. This cloud management platform can be an application that executes on a network administrator's computing device, or an application that the network administrator accesses (e.g., via a web browser, thin client application, etc.) in order to provide configuration instructions to the cloud management platform. The process 400 will be described in part by reference to FIG. 5, which illustrates routing tables provided to the gateway router 300 and connector routers 335-345 from FIG. 3.

As shown, the process 400 begins by receiving (at 405) a definition of a connectivity group and the addition of virtual datacenters to that connectivity group. In some embodiments, a connectivity group is allowed to include only a single virtual datacenter, but this serves little practical purpose. In some embodiments, a network administrator for an enterprise creates the connectivity group through a cloud management platform interface (e.g., a graphical user interface). In some embodiments, the cloud management platform allows the enterprise to create multiple such groups. In addition, as further described below, some embodiments require that the virtual datacenters in a connectivity group be located within the same geographic region (e.g., due to requirements of the public cloud(s) that host the virtual datacenters). Other embodiments do not place such restrictions on the virtual datacenters of a connectivity group.

Based on the creation of the connectivity group, the process 400 defines (at 410) a gateway router for connecting virtual datacenters in the group. In some embodiments, this gateway router is a logical router that is implemented by multiple physical entities (e.g., at each of the public cloud datacenters at which the virtual datacenters are located). In other embodiments, the gateway router is implemented at a single location (e.g., by a single virtual machine or other entity).

The process 400 then dynamically generates (at 415) routing tables for the connector routers at each virtual datacenter (i) to route traffic for other VDCs to the gateway router and (ii) to route for their virtual datacenter to the internal logical network of the virtual datacenter. In some embodiments, these latter routes specify to route the traffic to the T0 logical router at the virtual datacenter. The process 400 also generates (at 420) a routing table for the gateway router to route traffic for each virtual datacenter to the connector router at that virtual datacenter.

Figure 5:
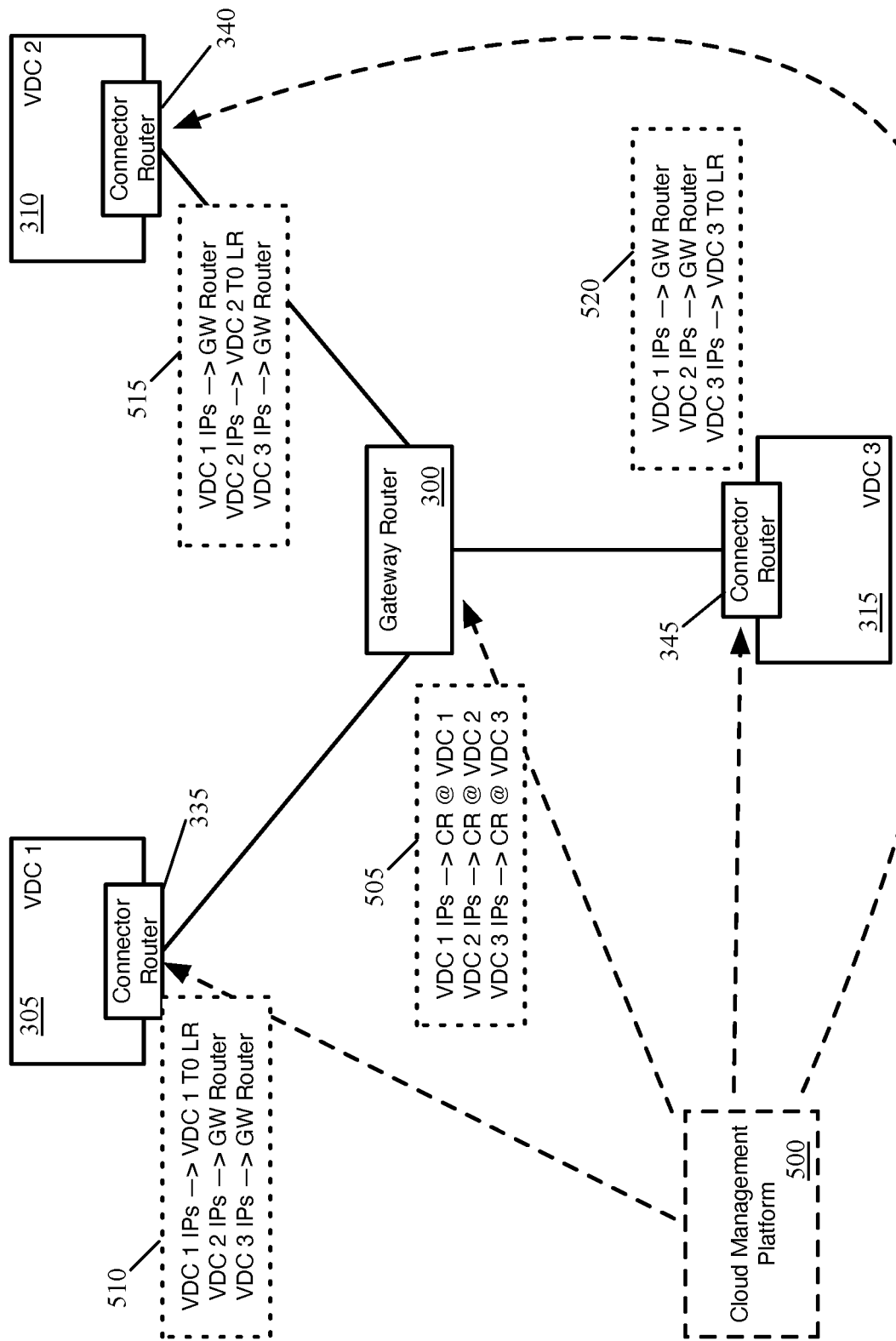
FIG. 5 conceptually illustrates the routing tables generated by a cloud management platform to configure the gateway router and connector routers for the connectivity group shown in FIG. 3.

FIG. 5 conceptually illustrates the routing tables generated by a cloud management platform 500 to configure the gateway router 300 and connector routers 335-345 for the connectivity group shown in FIG. 3. In some embodiments, the cloud management platform 500 generates these routing tables and configures the gateway router 300 and connector routers 335-345 by providing the routing tables to the entities implementing these routers.

The routing table 505 for the gateway router 300 includes (i) routes for IP addresses associated with the first virtual datacenter 305 that specify to route traffic directed to these IP addresses to the connector router 335 for the first virtual datacenter 305, (ii) routes for IP addresses associated with the second virtual datacenter 310 that specify to route traffic directed to these IP addresses to the connector router 340 for the second virtual datacenter 310, and (iii) routes for IP addresses associated with the third virtual datacenter 315 that specify to route traffic directed to these IP addresses to the connector router 345 for the third virtual datacenter 315. Each of these may include various subnets, so that the routing table 505 includes multiple routes for each datacenter. For instance, in some embodiments, these IP addresses include both IP addresses associated with the workload DCNs as well as IP addresses associated with the management components at each virtual datacenter. These IP addresses, in some embodiments, are the addresses that the various T1 logical routers at each virtual datacenter are configured to advertise. For instance, a compute T1 logical router might advertise only a single virtual IP address that represents an entire subnet of private IP addresses, with the T1 logical router performing load balancing and network address translation (NAT).

The routing table 510 for the connector router 335 at the first virtual datacenter 305 includes (i) routes for IP addresses associated with the first virtual datacenter 305 that specify to route traffic directed to these IP addresses to the T0 logical router at the first virtual datacenter 305 as well as (ii) routes for IP addresses associated with the second and third virtual datacenters 310 and 315 that specify to route traffic directed to these IP addresses to the gateway router 500. The routing table 515 for the connector router 340 at the second virtual datacenter 310 includes (i) routes for IP addresses associated with the second virtual datacenter 310 that specify to route traffic directed to these IP addresses to the T0 logical router at the second virtual datacenter 310 as well as (ii) routes for IP addresses associated with the first and third virtual datacenters 305 and 315 that specify to route traffic directed to these IP addresses to the gateway router 500. Lastly, the routing table 520 for the connector router 345 at the third virtual datacenter 315 includes (i) routes for IP addresses associated with the third virtual datacenter 315 that specify to route traffic directed to these IP addresses to the T0 logical router at the third virtual datacenter 315 as well as (ii) routes for IP addresses associated with the first and second virtual datacenters 305 and 310 that specify to route traffic directed to these IP addresses to the gateway router 500.

It should also be noted that in some such embodiments, the T0 logical router at each virtual datacenter is configured (e.g., with static routes) to route traffic for the IP addresses associated with each of the other virtual datacenters in the connectivity group to the local connector router. In some embodiments, the cloud management platform provides this information to the network management and control system at each virtual datacenter in the group, allowing the network manager and controller components to configure the logical networking within the virtual datacenter.

Returning to FIG. 4, the process 400 also dynamically generates (at 425) firewall rules to allow traffic between the virtual datacenters through the gateway router. In some embodiments, the default configuration for the gateway router and connector routers that enable a connectivity group is to block all traffic (as these routers should only be processing traffic for the specific network addresses associated with the virtual datacenters in the group). As such, some embodiments generate firewall rules for these routers allowing traffic with destination addresses associated with any of the virtual datacenters. In addition, some embodiments either automatically create firewall rules for the logical networks at each of the virtual datacenters or require the administrator to separately configure these firewall rules in order to enable traffic to be sent between workload endpoint DCNs at the different datacenters within a group.

Finally, the process 400 configures (at 430) the gateway router and the connector routers. The process then ends. In some embodiments, these routers are provided by the public cloud provider(s) that host the virtual datacenters. In this case, some embodiments interface with the public cloud provider system in order for the public cloud provider to configure the gateway router and/or connector routers based on information provided by the cloud management platform.

In addition, when networking at one of the virtual datacenters changes in a way that will affect the routes, the cloud management platform is responsible for modifying any of the affected routing tables in some embodiments. For instance, if a new subnet is added at a particular virtual datacenter by a network administrator (and advertised outside of that virtual datacenter), then the routing tables for all of the connector routers and the gateway router for the connectivity group to which the virtual datacenter belongs will be dynamically modified by the cloud management platform to account for that new subnet. Similarly, if a subnet is deleted at a virtual datacenter, then the cloud management platform dynamically modifies the routing tables for the gateway and connector routers to remove the routes for the deleted subnet. Along these lines, if a virtual datacenter is added to or removed from the group, then the cloud management platform dynamically adds or removes routes for all of the network addresses associated with that virtual datacenter (in addition to adding or removing the connector router for the virtual datacenter).

In the example shown in FIGS. 3 and 5, the connectivity group only connects virtual datacenters. In some embodiments, the cloud management platform also allows the user to connect the virtual datacenters in a group to (i) native virtual private clouds in a public cloud and/or (ii) on-premises datacenters. The native VPCs, in some embodiments, are not virtual datacenters in that they do not include management components and, in many cases, are not implemented on fully isolated hardware. That is, the host computers that host DCNs of the VPC may also host DCNs for other VPCs of other public cloud tenants. In some embodiments, the native VPCs may host services (e.g., load balancers, deep packet inspection, DHCP service, authentication service, endpoint service, etc.) used to process data traffic sent to or from the virtual datacenters. In some embodiments, these services in the native VPCs can include any custom service defined by the enterprise and running on a native cloud instance.

In addition, these native VPCs may be managed through the cloud management platform or through a cloud provider platform (i.e., the platform for the cloud provider to which the VPC is native) in different embodiments. For example, some embodiments enable the administrator for the enterprise to link an account with the cloud management platform that creates and manages the connectivity groups with the platform of a specific cloud provider that hosts the native VPCs (and, in some cases, the gateway router for the connectivity group). This allows the administrator to manage the native VPCs and attach these native VPCs to the gateway router for the connectivity group.

An administrator might also want the virtual datacenters to be able to connect to physical on-premises datacenters (e.g., a primary on-premises datacenter and one or more branch office datacenters). For instance, if only a portion of the enterprise's workload DCNs are moved into virtual datacenters, the on-premises workload DCNs might need to communicate with the workload DCNs in the virtual datacenter.

Figure 6:
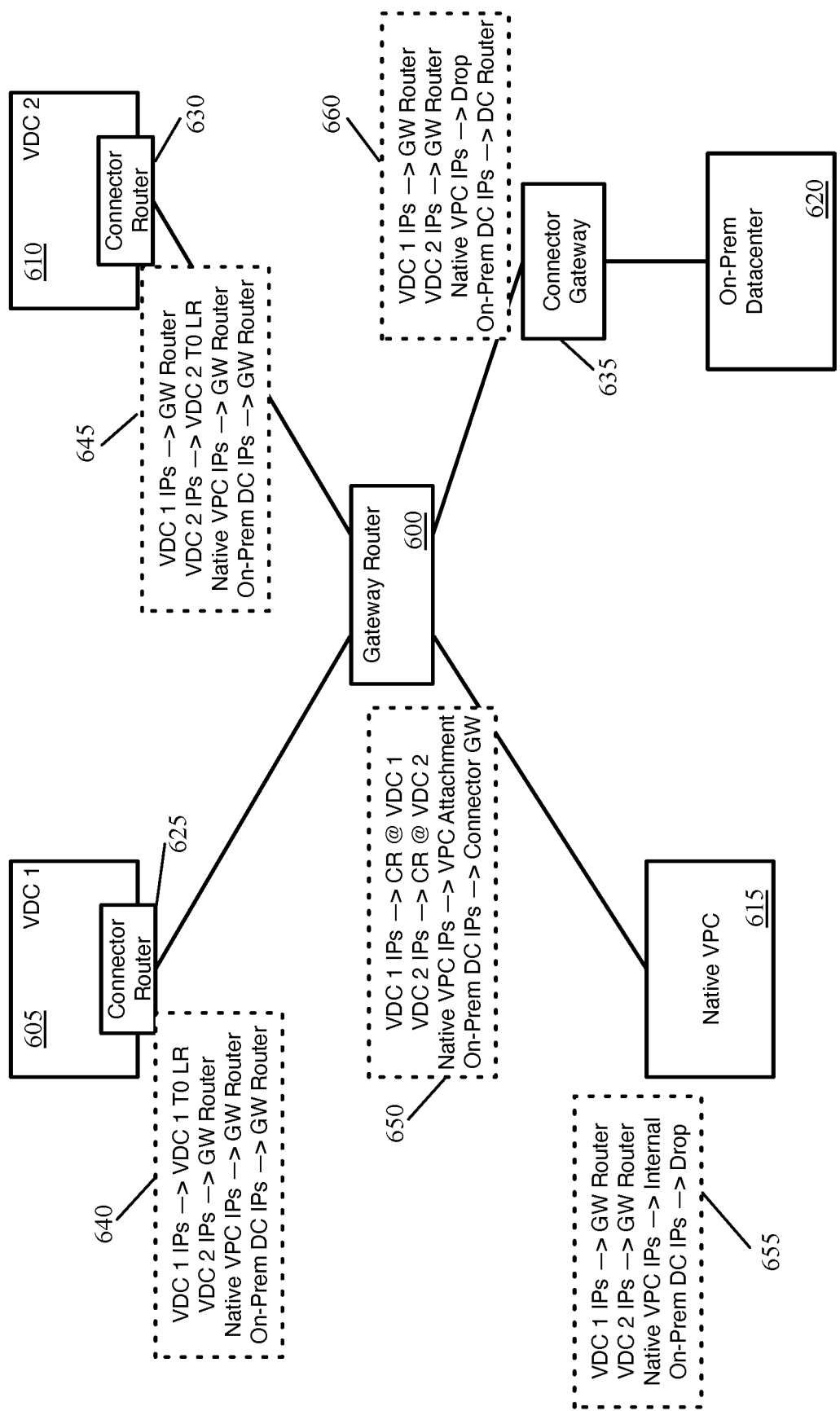
FIG. 6 conceptually illustrates two virtual datacenters that are connected via a connectivity group to each other as well as to a native VPC and an on-premises datacenter.

FIG. 6 conceptually illustrates two virtual datacenters 605 and 610 that are connected via a connectivity group to each other as well as to a native VPC 615 and an on-premises datacenter 620. As shown, connector routers 625 and 630 are configured at each of the two virtual datacenters 605 and 610, and these connect to a gateway router 600 as in the example of FIG. 3. The native VPC 615, in some embodiments, connects to the gateway router 600 via a VPC attachment when the native VPC and the gateway router are provided by the same public cloud provider. In other embodiments, an additional intervening router (similar to the connector routers 625 and 630) is required in order to connect the native VPC 615 to the virtual datacenters 605 and 610.

To connect the on-premises datacenter 620, in some embodiments an additional connector gateway router 635 is defined (and, e.g., implemented in the public cloud). Whereas the virtual datacenters 605 and 610, the native VPC 615, and the gateway router 600 all operate in public cloud datacenters (possibly belonging to the same public cloud provider), the on-premises datacenter 620 is a physical datacenter belonging to the enterprise. The connector gateway 635 is a specialized on-premises connection gateway provided by the public cloud provider in some embodiments, which attaches to the gateway router 600 and transmits traffic between the gateway router 600 and the on-premises datacenter 620. In different embodiments, the administrator defines the connector gateway 635 either directly through the cloud provider platform or through the cloud management platform (which interfaces with the cloud provider platform). The administrator can then connect the connector gateway 635 to the gateway router 600 in order to connect the on-premises datacenter 620 to the virtual datacenters 605 and 610 of the connectivity group.

FIG. 6 also shows the routing tables for the gateway router 600, the connector routers 625 and 630, the native VPC 615 (i.e., a router at the native VPC responsible for connecting to the gateway router 600), and the connector gateway 635. The routing table 640 for the connector router 625 at the first virtual datacenter 605 includes (i) routes for IP addresses associated with the first virtual datacenter 605 that specify to route traffic directed to these IP addresses to the T0 logical router at the first virtual datacenter 605 as well as (ii) routes for IP addresses associated with the second virtual datacenter 610, the native VPC 615, and the on-premises datacenter 620 that specify to route traffic directed to these IP addresses to the gateway router 600. Similarly, the routing table 645 for the connector router 630 at the second virtual datacenter 610 includes (i) routes for IP addresses associated with the second virtual datacenter 610 that specify to route traffic directed to these IP addresses to the T0 logical router at the second virtual datacenter 610 as well as (ii) routes for IP addresses associated with the first virtual datacenter 605, the native VPC 615, and the on-premises datacenter 620 that specify to route traffic directed to these IP addresses to the gateway router 600.

In turn, the routing table 650 for the gateway router 600 includes (i) routes for IP addresses associated with the first virtual datacenter 605 that specify to route traffic directed to these IP addresses to the connector router 625 for the first virtual datacenter 605, (ii) routes for IP addresses associated with the second virtual datacenter 610 that specify to route traffic directed to these IP addresses to the connector router 630 for the second virtual datacenter 610, (iii) routes for IP addresses associated with the native VPC 615 that specify to route traffic directed to these IP addresses to the attachment for the native VPC 615, and (iv) routes for IP addresses associated with the on-premises datacenter 620 that specify to route traffic directed to these IP addresses to the connector gateway 635.

The routing table 655 for the native VPC attachment includes (i) routes for IP addresses associated with the native VPC 615 that specify to route traffic directed to these IP addresses internally and (ii) routes for IP addresses associated with the first and second virtual datacenters 605 and 610 that specify to route traffic directed to these IP addresses to the gateway router 600. Similarly, the routing table 660 for the connector gateway 635 includes (i) routes for IP addresses associated with the on-premises datacenter 620 that specify to route traffic directed to these IP addresses to a router at that datacenter and (ii) routes for IP addresses associated with the first and second virtual datacenters 605 and 610 that specify to route traffic directed to these IP addresses to the gateway router 600.

In addition, the routing table 655 for the native VPC attachment indicates that traffic directed to IP addresses associated with the on-premises datacenter should be dropped. Similarly, the routing table 660 for the connector gateway 635 indicates that traffic directed to IP addresses associated with the native VPC should be dropped. It should be noted that in some embodiments these rules are implemented as firewall rules rather than as routes in the routing tables. Some embodiments place restrictions on the traffic that (i) allow traffic between two virtual datacenters in a group, (ii) allow traffic between any virtual datacenter in the group and a native VPC connected to the centralized gateway router, (iii) allow traffic between any virtual datacenter in the group and an on-premises datacenter connected to the centralized gateway, (iv) do not allow traffic between two different on-premises datacenters connected to the centralized gateway, (v) do not allow traffic between two different native VPCs connected to the centralized gateway, and (vi) do not allow traffic between native VPCs and on-premises datacenters connected to the centralized gateways. In some embodiments, these are default security rules that the user of the cloud management platform can modify if desired.

In addition, as mentioned above, some embodiments impose a restriction that all of the virtual datacenters in a connectivity group must be located in datacenters within a single predefined geographic region (e.g., Eastern US, Western US, Europe, East Asia, etc.). These geographic regions can be defined by the cloud management platform through which the groups are defined, or by the public cloud provider(s) that host the virtual datacenters.

Other embodiments allow for a connectivity group to include virtual datacenters from multiple such geographic regions. To include virtual datacenters from multiple regions, some embodiments require gateway routers to be defined and configured in each of the geographic regions, with these gateway routers connected to each other in order to enable connectivity between all of the virtual datacenters.

Figure 7:
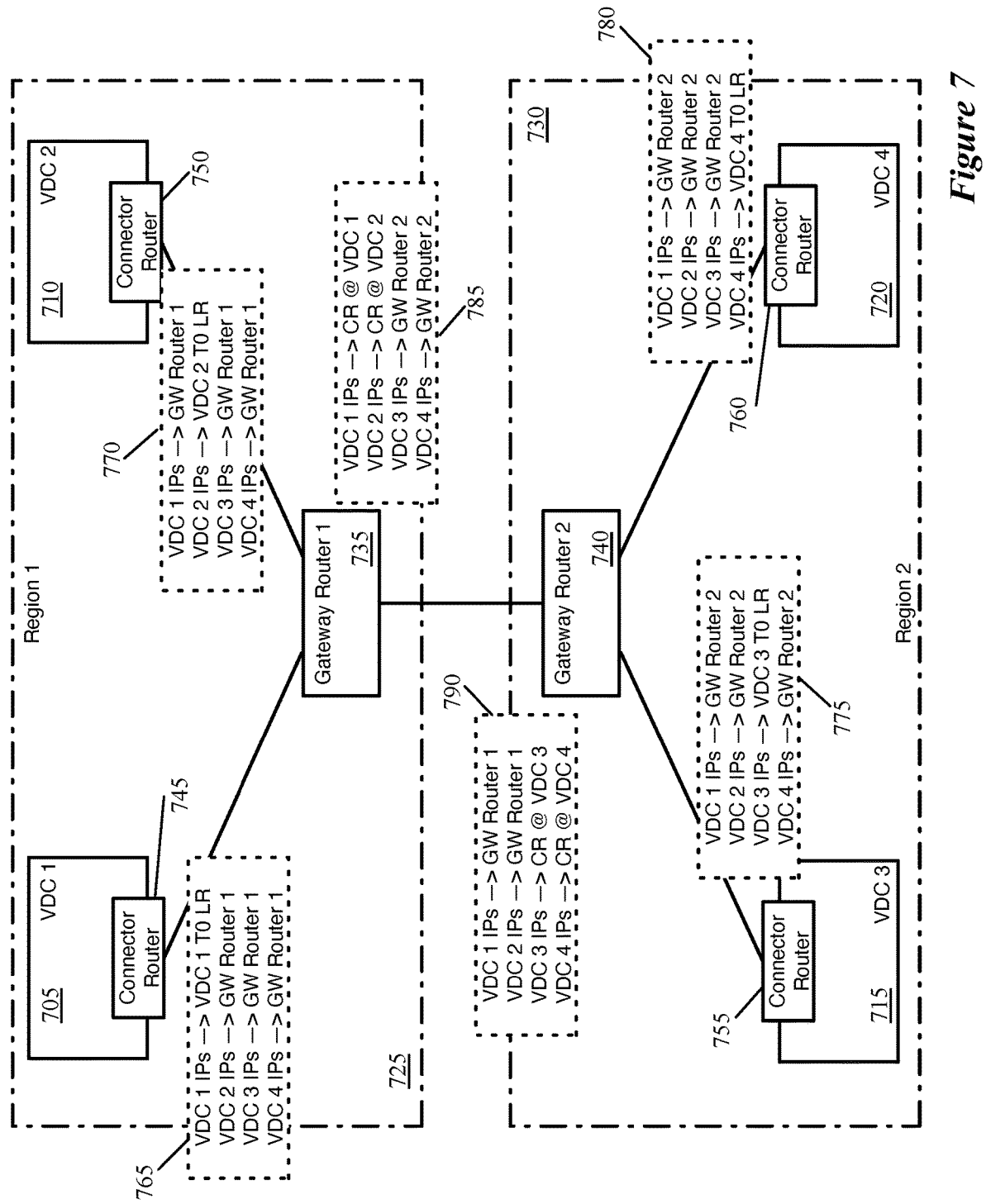
FIG. 7 conceptually illustrates a group of virtual datacenters connected in a connectivity group that spans two geographic regions.

FIG. 7 conceptually illustrates a group of virtual datacenters 705-720 connected in a connectivity group that spans two geographic regions 725 and 730. In this case, when the virtual datacenters in a connectivity group span two or more regions, some embodiments define a gateway router in each geographic region rather than a single gateway router to which all of the virtual datacenters connect. In this case, the two virtual datacenters 705 and 710 located in the first geographic region 725 connect to a first gateway router 735, while the two virtual datacenters 715 and 720 located in the second geographic region 730 connect to a second gateway router 740. In some embodiments, if any native VPCs are connected to the group, these connect to the gateway router in their geographic region. Similarly, to connect an on-premises datacenter to the group, a connector gateway is instantiated in a particular region that connects to the gateway router in that particular region.

The routing tables 765-780 for connector routers 745-760 at each of the virtual datacenters specify to send incoming traffic for the local virtual datacenter to the internal logical network of that virtual datacenter and to send outgoing traffic for any of the other virtual datacenters to the local gateway router. Specifically, the routing table 765 for the connector router 745 at the first virtual datacenter 705 includes (i) routes for IP addresses associated with the first virtual datacenter 705 that specify to route traffic directed to these IP addresses to the T0 logical router at the first virtual datacenter 705 as well as (ii) routes for IP addresses associated with the second, third, and fourth virtual datacenters 710-720 that specify to route traffic directed to these IP addresses to the first gateway router 735. The routing table 770 for the connector router 750 at the second virtual datacenter 710 includes (i) routes for IP addresses associated with the second virtual datacenter 710 that specify to route traffic directed to these IP addresses to the T0 logical router at the second virtual datacenter 710 as well as (ii) routes for IP addresses associated with the first, third, and fourth virtual datacenters 705, 715, and 720 that specify to route traffic directed to these IP addresses to the first gateway router 735. The routing table 775 for the connector router 755 at the third virtual datacenter 715 includes (i) routes for IP addresses associated with the third virtual datacenter 715 that specify to route traffic directed to these IP addresses to the T0 logical router at the third virtual datacenter 715 as well as (ii) routes for IP addresses associated with the first, second, and fourth virtual datacenters 705, 710, and 720 that specify to route traffic directed to these IP addresses to the second gateway router 740. Finally, the routing table 780 for the connector router 760 at the fourth virtual datacenter 720 includes (i) routes for IP addresses associated with the fourth virtual datacenter 720 that specify to route traffic directed to these IP addresses to the T0 logical router at the fourth virtual datacenter 720 as well as (ii) routes for IP addresses associated with the first, second, and third virtual datacenters 705-715 that specify to route traffic directed to these IP addresses to the second gateway router 740.

In each region, the gateway router is configured to send traffic for the virtual datacenters in that region to the connector router at that virtual datacenter and to send traffic for the virtual datacenters in other regions to the gateway router in the region at which the destination virtual datacenter is located. Specifically, the routing table 785 for the first gateway router 735 in the first region 725 includes (i) routes for IP addresses associated with the first virtual datacenter 705 that specify to route traffic directed to these IP addresses to the connector router 745 for the first virtual datacenter 705, (ii) routes for IP addresses associated with the second virtual datacenter 710 that specify to route traffic directed to these IP addresses to the connector router 750 for the second virtual datacenter 710, and (iii) routes for IP addresses associated with the third and fourth virtual datacenters 715 and 720 that specify to route traffic directed to these IP addresses to the second gateway router 740 in the second region 730. Correspondingly, the routing table 790 for the second gateway router 740 in the second region 730 includes (i) routes for IP addresses associated with the third virtual datacenter 715 that specify to route traffic directed to these IP addresses to the connector router 755 for the third virtual datacenter 715, (ii) routes for IP addresses associated with the fourth virtual datacenter 720 that specify to route traffic directed to these IP addresses to the connector router 760 for the second virtual datacenter 720, and (iii) routes for IP addresses associated with the first and second virtual datacenters 705 and 710 that specify to route traffic directed to these IP addresses to the first gateway router 735 in the first region 725.

In some embodiments, when a group includes virtual datacenters located in more than two regions, the gateway routers form a mesh network. In other embodiments, not all of the gateway routers will connect directly to all of the other gateway routers. For instance, a connectivity group with virtual datacenters located in Western Europe, Eastern Europe, North Africa, Eastern US, and Western US might have a connection between the gateway routers in the two US regions, a mesh connection between the gateway routers in Europe and North Africa, and a connection between the Eastern US and Western Europe.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for routing data traffic between a group of virtual datacenters implemented in a public cloud, the method comprising:

at a gateway router to which each of at least two of the virtual datacenters in the group of virtual datacenters connect, each respective virtual datacenter comprising a respective set of network management components implemented in the public cloud and a respective set of network endpoints executing in the public cloud and connected by a respective logical network that is managed by the respective network management components of respective virtual datacenter:

receiving routes advertised by the respective logical network at each of the virtual datacenters that connect to the gateway router; and using the received routes to route data traffic, sent between the logical networks of the virtual datacenters of the group, to routers configured between the logical networks at each of the virtual datacenters and the gateway router;

wherein first traffic entering and exiting a virtual datacenter is associated with a first tier router and a second traffic between the network management components is associated with a second tier router, the first tier router and the second tier router being configured to separate the first traffic and the second traffic, the first tier router being a tier-0 router, the second tier router being a tier-1 router, a virtual datacenter being defined with two tier-1 routers connected to a tier-0 router, the tier-0 router comprising a logical router configured to handle traffic entering and exiting the virtual datacenter, the two tier-1 routers comprising a management gateway and a compute gateway segregated by the tier-0 router.

2. The method of claim 1, wherein the routes for each virtual datacenter comprise (i) routes for network addresses associated with the network management components of the virtual datacenter and (ii) routes for network addresses associated with the logical network endpoints of the virtual datacenter.

3. The method of claim 1, wherein (i) the gateway router and (ii) the routers configured for each of the virtual datacenters to connect the virtual datacenters to the gateway router are configured by a cloud management platform.

4. The method of claim 1, wherein the logical network at a particular virtual datacenter comprises:
   a first logical router for handling data traffic entering and exiting the particular virtual datacenter;
   a second logical router for connecting one or more management network segments to the first logical router, wherein the network management components are connected to the management network segments; and
   a third logical router for connecting one or more logical network segments with network endpoints to the first logical router.

5. The method of claim 4, wherein the routes received from the particular datacenter are advertised by the second and third logical routers.

6. The method of claim 1 further comprising:
   receiving routes for network addresses associated with a virtual private cloud (VPC) of the public cloud that hosts services native to the public cloud; and
   using the routes for the network addresses associated with the VPC to route data traffic, sent from the logical networks of the virtual datacenters to the services hosted at the VPC, to a network attachment for the VPC.

7. The method of claim 1, wherein the group is associated with a particular enterprise, wherein the gateway router is a first gateway router, wherein the method further comprises:
   receiving routes for network addresses associated with an on-premises datacenter of the enterprise that belongs to the group; and
   using the routes for the network addresses associated with the on-premises datacenter to route data traffic, sent from the logical networks of the virtual datacenters to network endpoints located at the on-premises datacenter, to a second gateway router that provides connectivity for the on-premises datacenter.

8. The method of claim 7, wherein the second gateway is implemented in the public cloud and uses one of a virtual private network (VPN) and a dedicated line to communicate with the on-premises datacenter.

9. The method of claim 7, wherein the first gateway router (i) allows data traffic between the virtual datacenters and the on-premises datacenter, (ii) allows data traffic between the virtual datacenters and any VPCs added to the group, (iii) does not allow traffic between the on-premises datacenter and any other on-premises datacenters added to the group, and (iv) does not allow traffic between the on-premises datacenter and any VPCs added to the group.

10. The method of claim 1, wherein the gateway router and the at least two datacenters are located in a first region of the public cloud, wherein the gateway router is a first gateway router, wherein the method further comprises:
   receiving routes advertised by the respective logical networks at each of a set of one or more virtual datacenters that are located in a second region of the public cloud and connect to a second gateway router also located in the second region of the public cloud; and
   using said routes to route data traffic, sent from the logical networks of the virtual datacenters located in the first region to the logical networks of the virtual datacenters located in the second region, to the second gateway router.

11. The method of claim 1, wherein the gateway router is implemented as a horizontally scalable router in the public cloud.

12. A non-transitory machine-readable medium storing a program which when executed by at least one processing unit implements a gateway router for routing data traffic between a group of virtual datacenters implemented in a public cloud, the program comprising sets of instructions for:
   receiving routes advertised by a respective logical network at each of at least two virtual datacenters in the group of virtual datacenters that connect to the gateway router, each respective virtual datacenter comprising a respective set of network management components implemented in the public cloud and a respective set of network endpoints executing in the public cloud and connected by a respective logical network that is managed by the respective network management components of respective virtual datacenter; and
   using the received routes to route data traffic, sent between the logical networks of the virtual datacenters of the group, to routers configured between the logical networks at each of the virtual datacenters and the gateway router;
   wherein a first traffic entering and existing a virtual datacenter is associated with a first tier router and a traffic between the network management components is associated with a second tier router, the first tier router and the second tier router being configured to separate the first traffic and the second traffic, the first tier router being a tier-0 router, the second tier router being a tier-1 router, a virtual datacenter being defined with two tier-1 routers connected to a tier-0 router, the tier-0 router comprising a logical router configured to handle traffic entering and exiting the virtual datacenter, the two tier-1 routers comprising a management gateway and a compute gateway segregated by the tier-0 router.

13. The non-transitory machine-readable medium of claim 12, wherein the routes for each virtual datacenter comprise (i) routes for network addresses associated with the network management components of the virtual datacenter and (ii) routes for network addresses associated with the logical network endpoints of the virtual datacenter.

14. The non-transitory machine-readable medium of claim 12, wherein (i) the gateway router and (ii) the routers configured for each of the virtual datacenters to connect the virtual datacenters to the gateway router are configured by a cloud management platform.

15. The non-transitory machine-readable medium of claim 12, wherein the logical network at a particular virtual datacenter comprises:
   a first logical router for handling data traffic entering and exiting the particular virtual datacenter;
   a second logical router for connecting one or more management network segments to the first logical router, wherein the network management components are connected to the management network segments; and a third logical router for connecting one or more logical network segments with network endpoints to the first logical router.

16. The non-transitory machine-readable medium of claim 12, wherein the program further comprises sets of instructions for:

receiving routes for network addresses associated with a virtual private cloud (VPC) of the public cloud that hosts services native to the public cloud; and using the routes for the network addresses associated with the VPC to route data traffic, sent from the logical networks of the virtual datacenters to the services hosted at the VPC, to a network attachment for the VPC.

17. The non-transitory machine-readable medium of claim 12, wherein the group is associated with a particular enterprise, wherein the gateway router is a first gateway router, wherein the program further comprises sets of instructions for:

receiving routes for network addresses associated with an on-premises datacenter of the enterprise that belongs to the group; and using the routes for the network addresses associated with the on-premises datacenter to route data traffic, sent from the logical networks of the virtual datacenters to network endpoints located at the on-premises datacenter, to a second gateway router that provides connectivity for the on-premises datacenter.

18. The non-transitory machine-readable medium of claim 17, wherein the second gateway is implemented in the public cloud and uses one of a virtual private network (VPN) and a dedicated line to communicate with the on-premises datacenter.

19. The non-transitory machine-readable medium of claim 17, wherein the first gateway router (i) allows data traffic between the virtual datacenters and the on-premises datacenter, (ii) allows data traffic between the virtual datacenters and any VPCs added to the group, (iii) does not allow traffic between the on-premises datacenter and any other on-premises datacenters added to the group, and (iv) does not allow traffic between the on-premises datacenter and any VPCs added to the group.

20. The non-transitory machine-readable medium of claim 2, wherein the gateway router and the at least two datacenters are located in a first region of the public cloud, wherein the gateway router is a first gateway router, wherein the program further comprises sets of instructions for:

receiving routes advertised by the respective logical networks at each of a set of one or more virtual datacenters that are located in a second region of the public cloud and connect to a second gateway router also located in the second region of the public cloud; and using said routes to route data traffic, sent from the logical networks of the virtual datacenters located in the first region to the logical networks of the virtual datacenters located in the second region, to the second gateway router.

* * * * *